United States Patent
Kawai

(10) Patent No.: US 6,971,266 B2
(45) Date of Patent: Dec. 6, 2005

(54) THERMOSENSITIVE FLOW RATE DETECTING ELEMENT AND METHOD FOR THE MANUFACTURE THEREOF

(75) Inventor: Masahiro Kawai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 61 days.

(21) Appl. No.: 10/780,673

(22) Filed: Feb. 19, 2004

(65) Prior Publication Data

US 2005/0000283 A1    Jan. 6, 2005

(30) Foreign Application Priority Data

Jul. 2, 2003    (JP) .............................. 2003-190484

(51) Int. Cl.[7] .............................................. G01F 1/68
(52) U.S. Cl. ................................................... 73/204.26
(58) Field of Search ...................... 73/204.26, 204.11, 73/204.22, 204.23, 204.25

(56) References Cited

U.S. PATENT DOCUMENTS 5,056,362 A * 10/1991 Ang et al. ............... 73/204.26
5,633,552 A * 5/1997 Lee et al. .................... 310/311
6,015,722 A * 1/2000 Banks et al. ................. 438/108
6,032,527 A * 3/2000 Genova et al. ........... 73/204.26
6,562,404 B1 * 5/2003 Folta et al. ............ 427/255.393

FOREIGN PATENT DOCUMENTS

JP    2002-357467 A    12/2002

* cited by examiner

Primary Examiner—Harshad Patel
Assistant Examiner—Corey D. Mack
(74) Attorney, Agent, or Firm—Sughrue Mion, PLLC

(57) ABSTRACT

Cavities are formed so as to extend from a rear surface side of a base material to a protective film, an electrically-insulating film is formed on a rear surface of the base material, wall surfaces of the cavities, and exposed surfaces of the protective film, and a heating resistor portion and a fluid temperature resistance thermometer portion are formed on portions of the electrically-insulating film on the exposed surfaces of the protective film inside the cavities. In addition, leader patterns are formed on the electrically-insulating film so as to extend from end portions of the heating resistor portion and the fluid temperature resistance thermometer portion along the wall surfaces of the cavities onto the rear surface of the base material.

7 Claims, 7 Drawing Sheets

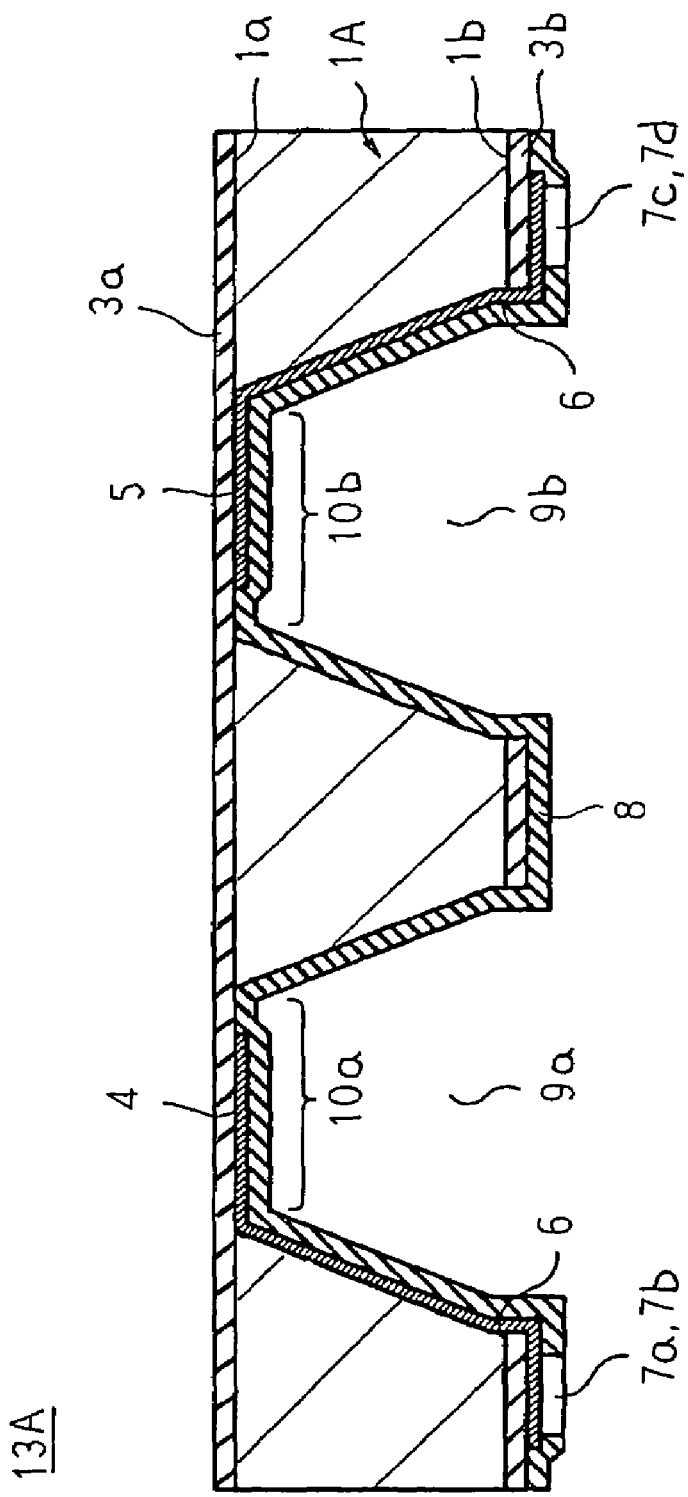

THERMOSENSITIVE FLOW RATE DETECTING ELEMENT AND METHOD FOR THE MANUFACTURE THEREOF

BACKGROUND OF THE INVENTION

1. Field of the Invention

The present invention relates to a flow rate detecting element and a method for the manufacture thereof for measuring an intake air flow rate in an internal combustion engine, for example, and relates particularly to a thermosensitive flow rate detecting element and a method for the manufacture thereof provided with a heating element used in a flow rate sensor for measuring a flow velocity and flow rate of a fluid based on heat transfer to the fluid from the heating element or a portion heated by the heating element.

2. Description of the Related Art

In conventional flow rate detecting elements, thin film layers composed of an electrically-conductive film and electrically-insulating films are formed on a front surface of a substrate, a cavity part is formed from a rear surface side of the substrate so as to leave the thin film layers, and a thin-film portion (a detecting portion) composed of a thin film layer is formed on the cavity part. Penetrating apertures are formed so as to reach the electrically-conductive film from the rear surface of the substrate in regions where the cavity part is not formed, conductors are formed on wall surfaces of the penetrating apertures, and a substrate conductor portion is formed on the rear surface of the substrate so as to be electrically connected to the electrically-conductive film by means of the conductors. (Patent Literature 1, for example.)

Patent Literature 1: Japanese Patent Laid-Open No. 2002-357467 (Gazette)

In conventional flow rate detecting elements, because a thin-film portion functioning as a detecting portion is formed on the front surface of the substrate, irregularities arise on the front surface of the substrate exposed to the fluid being measured. Thus, disturbances at the front surface of the thin-film portion may arise in the flow of the fluid being measured, making flow characteristics irregular, or during long periods of use, dust may accumulate in the irregular portions, changing the mode of the fluid being measured as it flows over the front surface of the thin-film portion, and therefore one problem is that flow rate detection characteristics fluctuate.

Because the penetrating apertures are formed so as to reach the electrically-conductive film by removing the substrate and the electrically-insulating film from the rear surface of the substrate, and then conductors are formed on the wall surfaces of the penetrating apertures and the exposed surface of the electrically-conductive film, bonding strength at joint portions between the conductors and the electrically-conductive film may be decreased, or reactions may occur at the joining interfaces due to heat and electric current, giving rise to changes in resistance in the joint portions, and therefore another problem is that good reliability cannot be achieved.

In order to wire from the electrically-conductive film on the front surface of the substrate to the substrate conductor portion on the rear surface of the substrate, it is necessary to form penetrating apertures so as to extend from the rear surface side of the substrate to the electrically-conductive film and also to form conductors on the wall surfaces of the penetrating apertures and the exposed surface of the electrically-conductive film, and therefore another problem is that manufacturing processes are complicated.

Because it is necessary to avoid the region where the cavity part is formed when forming the penetrating apertures for electrode extraction on the substrate, special regions are required for forming the penetrating apertures, and therefore another problem is that reductions in the size of the flow rate detecting element are not possible.

Because the penetrating apertures are formed in addition to the cavity part, mechanical strength of the substrate decreases, and therefore another problem is that damage to the substrate due to stresses on the substrate arising in processes for connecting an exterior portion and the substrate conductor portion by wire bonding, etc., dropping of the flow rate detecting element, etc., occurs easily.

SUMMARY OF THE INVENTION

The present invention aims to solve the above problems and an object of the present invention is to provide a thermosensitive flow rate detecting element and a method for the manufacture thereof achieving stable flow rate detection characteristics by forming an electrically-insulating film so as to cover an opening on a front surface side of a cavity formed so as to pass through a base material and forming a heating resistor portion composed of a thermosensitive resistor film on an exposed surface of the electrically-insulating film exposed inside the cavity to suppress the occurrence of disturbances to fluid flow and the accumulation of dust resulting from irregularities on the front surface of the base material.

In order to achieve the above object, according to one aspect of the present invention, there is provided a thermosensitive flow rate detecting element including a flat base material; a cavity formed so as to pass through the base material from a rear surface to a front surface; an electrically-insulating film formed so as to be positioned in a common plane with the front surface of the base material and to cover an aperture of the cavity on a front surface side of the base material; and a heating resistor portion composed of a thermosensitive resistor film formed from a rear surface side of the base material on a portion of the electrically-insulating film formed at a position of the aperture of the cavity.

Therefore, a thermosensitive flow rate detecting element having stable flow rate detection characteristics by suppressing the occurrence of disturbances to the flow of a fluid and the accumulation of dust resulting from irregularities on the front surface of the base material is provided.

According to another aspect of the present invention, there is provided a thermosensitive flow rate detecting element including a flat base material having an electrically-insulating film formed over an entire surface of a front surface; a cavity formed by removing a portion of the base material from a rear surface side of the base material so as to extend to the electrically-insulating film; and a heating resistor portion composed of a thermosensitive resistor film formed on an exposed surface of the electrically-insulating film exposed inside the cavity.

Therefore, a thermosensitive flow rate detecting element having stable flow rate detection characteristics by suppressing the occurrence of disturbances to the flow of a fluid and the accumulation of dust resulting from irregularities on the front surface of the base material is provided.

According to yet another aspect of the present invention, there is provided a method for manufacturing a thermosensitive flow rate detecting element including a step of forming a protective film on a front surface of a flat base material; a step of forming a cavity by removing a portion of the base material from a rear surface side of the base material so as to extend to the protective film; a step of forming an electrically-insulating film on a rear surface of the base material, a wall surface of the cavity, and an exposed surface of the protective film exposed inside the cavity; and a step of forming a heating resistor portion composed of a thermosensitive resistor film on a portion of the electrically-insulating film formed on the exposed surface of the protective film.

Therefore, a method for manufacturing a thermosensitive flow rate detecting element having stable flow rate detection characteristics by suppressing the occurrence of disturbances to the flow of a fluid and the accumulation of dust resulting from irregularities on the front surface of the base material is provided.

BRIEF DESCRIPTION OF THE DRAWINGS

FIG. 9 is a cross section showing a thermosensitive flow rate detecting element according to Embodiment 2 of the present invention.

DETAILED DESCRIPTION OF THE PREFERRED EMBODIMENTS

Preferred embodiments of the present invention will now be explained with reference to the drawings.

Embodiment 1

Figure 1:
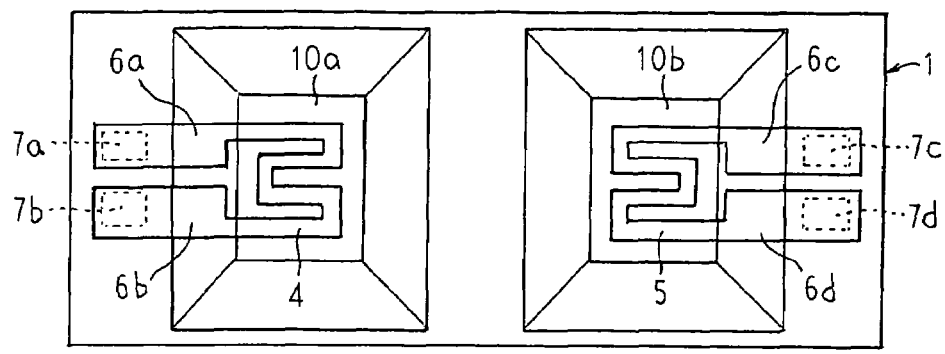
FIG. 1 is a bottom plan showing a thermosensitive flow rate detecting element according to Embodiment 1 of the present invention.
Figure 2:
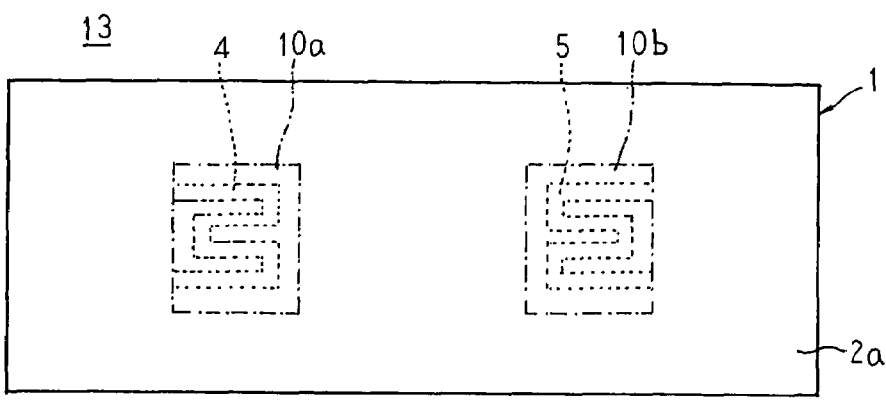
FIG. 2 is a top plan showing the thermosensitive flow rate detecting element according to Embodiment 1 of the present invention.
Figure 3:
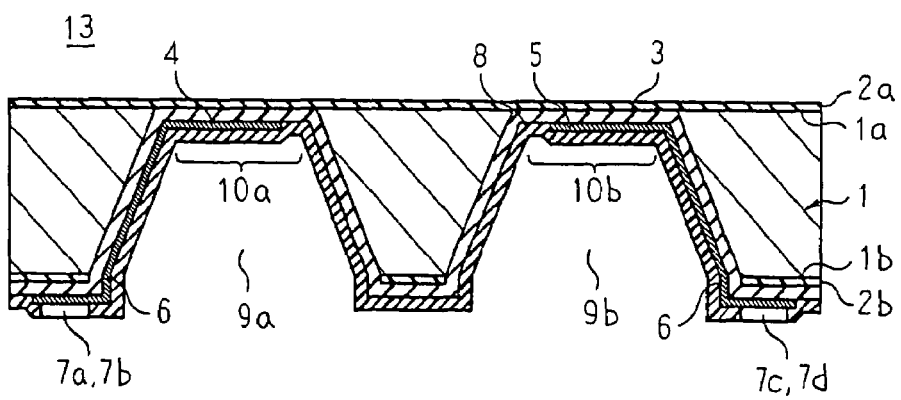
FIG. 3 is a cross section showing the thermosensitive flow rate detecting element according to Embodiment 1 of the present invention.

FIG. 1 is a bottom plan showing a thermosensitive flow rate detecting element according to Embodiment 1 of the present invention, FIG. 2 is a top plan showing the thermosensitive flow rate detecting element according to Embodiment 1 of the present invention, and FIG. 3 is a cross section showing the thermosensitive flow rate detecting element according to Embodiment 1 of the present invention. Moreover, a rear-surface protective film is omitted from FIG. 1. In order to make the construction easier to see, FIGS. 1 to 3 are not drawn to actual scale. This also applies to all of the figures below.

In FIGS. 1 to 3, a base material 1 is a silicon substrate formed into a flat, rectangular shape, for example. A first protective film 2a composed of a thermal oxidation film, etc., is formed over an entire surface of a front surface 1a of the base material 1. A second protective film 2b composed of a thermal oxidation film, etc., is formed over an entire surface of a rear surface 1b of the base material 1 so as to have two rectangular aperture portions. First and second cavities 9a and 9b are formed by removing portions of the base material 1 so as to extend to the first protective film 2a from each of the aperture portions of the second protective film 2b. These cavities 9a and 9b are disposed so as to be separated from each other in a longitudinal direction of the base material 1, each being formed with a trapezoidal cross-sectional shape perpendicular to the front surface 1a of the base material 1. In addition, an electrically-insulating film 3 composed of silicon nitride, etc., is formed from a rear surface 1b side of the base material 1 so as to cover the second protective film 2b, wall surfaces of the first and second cavities 9a and 9b, and exposed surfaces of the first protective film 2a.

A heating resistor portion 4 composed of a thermosensitive resistor film is formed on the electrically-insulating film 3 formed on the exposed surface of the first protective film 2a inside the first cavity 9a, and a fluid temperature resistance thermometer portion 5 composed of a thermosensitive resistor film is formed on the electrically-insulating film 3 formed on the exposed surface of the second protective film 2a inside the second cavity 9b. First to fourth leader patterns 6a to 6d are formed on the electrically-insulating film 3 so as to extend from end portions of the heating resistor portion 4 and the fluid temperature resistance thermometer portion 5 along the wall surfaces of the first and second cavities 9a and 9b to the rear surface 1b of the base material 1. In addition, an electrically-insulating rear-surface protective film 8 made of silicon nitride, etc., is formed on the electrically-insulating film 3 so as to cover the heating resistor portion 4, the fluid temperature resistance thermometer portion 5, and the first to fourth leader patterns 6a to 6d.

Here, the thermosensitive resistor film constituting the heating resistor portion 4, the fluid temperature resistance thermometer portion 5, and the first to fourth leader patterns 6a to 6d is a resistor film composed of a material whose resistance value is dependant on temperature and is made of platinum, for example. A first thin-walled diaphragm 10a formed by laminating the first protective film 2a, the electrically-insulating film 3, the heating resistor portion 4, and the rear-surface protective film 8 is constructed over the first cavity 9a such that a perimeter thereof is supported by the base material 1. Similarly, a second thin-walled diaphragm 10b formed by laminating the first protective film 2a, the electrically-insulating film 3, the fluid temperature resistance thermometer portion 5, and the rear-surface protective film 8 is constructed over the second cavity 9b such that a perimeter thereof is supported by the base material 1.

In addition, first to fourth electrodes 7a to 7d are formed by removing portions of the rear-surface protective film 8 so as to expose end portions of the first to fourth leader patterns 6a to 6d. The first to fourth electrodes 7a to 7d and external equipment are connected by any well-known technique such as flip chip bonding, wire bonding, etc. Thus, the heating resistor portion 4 and the fluid temperature resistance thermometer portion 5 are connected to the external equipment by means of the first to fourth leader patterns 6a to 6d.

Next, a method for manufacturing a flow rate detecting element 13 constructed in this manner will be explained with reference to FIGS. 4A to 4D and 5A to 5D.

Figure 4A:
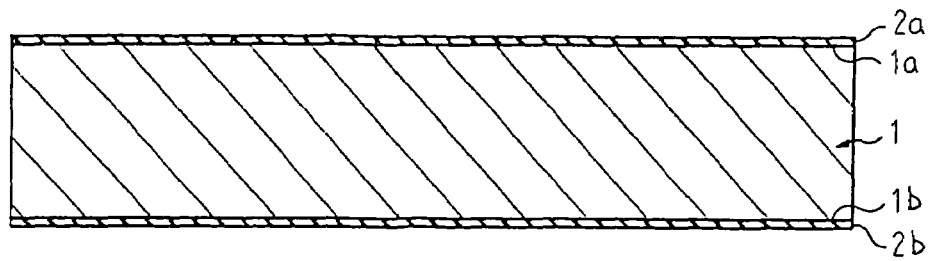
FIG. 4A is a process cross section explaining a method for manufacturing the thermosensitive flow rate detecting element according to Embodiment 1 of the present invention.

First, as shown in FIG. 4A, a base material 1 composed of a flat, rectangular silicon substrate having a (100) crystal orientation is prepared, and thermal oxidation films are formed over the entire surfaces of the front surface 1a and the rear surface 1b of the base material 1. Here, the thickness of the base material 1 is 400 $\mu$m, for example, and the thickness of the thermal oxidation films is 0.5 $\mu$m, for example. The thermal oxidation film formed on the front surface 1a of the base material 1 constitutes the first protective film 2a, and the thermal oxidation film formed on the rear surface 1b constitutes the second protective film 2b.

Figure 4B:
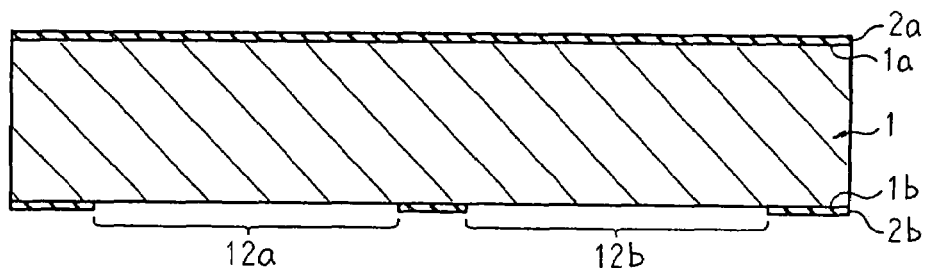
FIG. 4B is another process cross section explaining the method for manufacturing the thermosensitive flow rate detecting element according to Embodiment 1 of the present invention.

Next, a resist is applied to the entire surface of the second protective film 2b formed on the rear surface 1b of the base material 1, and the resist is patterned using a photoengraving technique to form rectangular apertures in the resist. Portions of the second protective film 2b exposed through the aperture portions are removed by etching, as shown in FIG. 4B, to form rectangular etching apertures 12a and 12b.

Figure 4C:
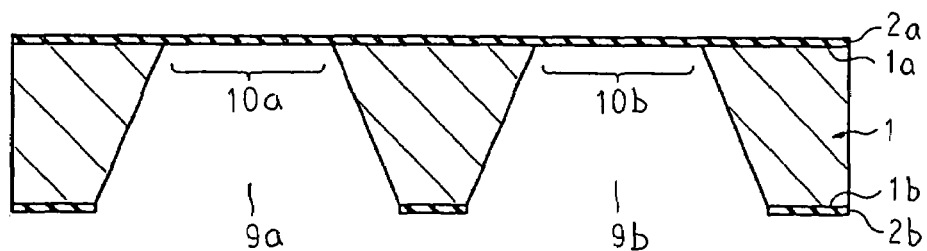
FIG. 4C is yet another process cross section explaining the method for manufacturing the thermosensitive flow rate detecting element according to Embodiment 1 of the present invention.

Next, alkali etching, for example, is applied to remove the base material 1 from the etching apertures 12a and 12b through to the first protective film 2a. Thus, the first and second cavities 9a and 9b are formed, as shown in FIG. 4C. Here, KOH, tetramethyl ammonium hydroxide (TMAH), NaOH, etc., may be used as the etchant.

Figure 4D:
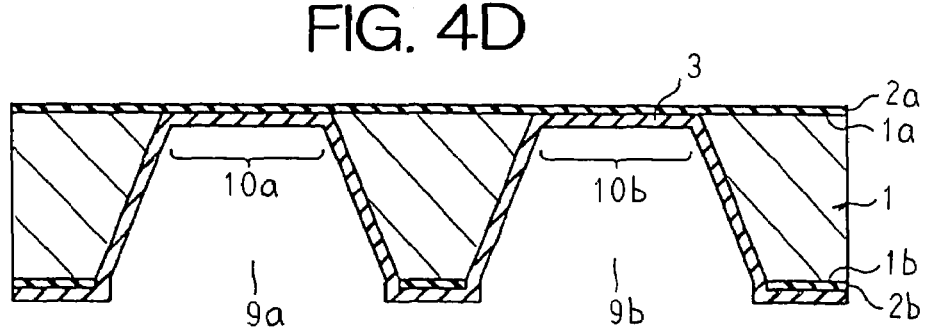
FIG. 4D is yet another process cross section explaining the method for manufacturing the thermosensitive flow rate detecting element according to Embodiment 1 of the present invention.

Next, the resist is removed, and a film of silicon nitride is formed to a thickness of 1.0 $\mu$m, for example, over the entire surface from the rear surface side of the base material 1 using a method such as sputtering or chemical vapor deposition (CVD), etc., to form the electrically-insulating film 3, as shown in FIG. 4D.

Figure 5A:
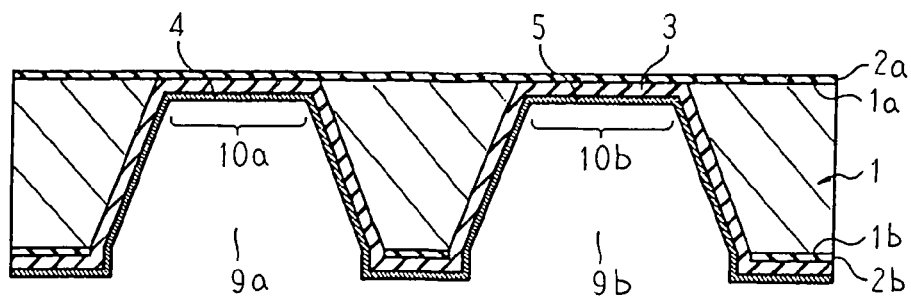
FIG. 5A is a process cross section explaining the method for manufacturing the thermosensitive flow rate detecting element according to Embodiment 1 of the present invention.

In addition, as shown in FIG. 5A, a film of platinum is formed to a thickness of 0.2 $\mu$m, for example, over the entire surface of the electrically-insulating film 3 from the rear surface side of the base material 1 using a method such as vapor deposition or sputtering, etc.

Figure 5B:
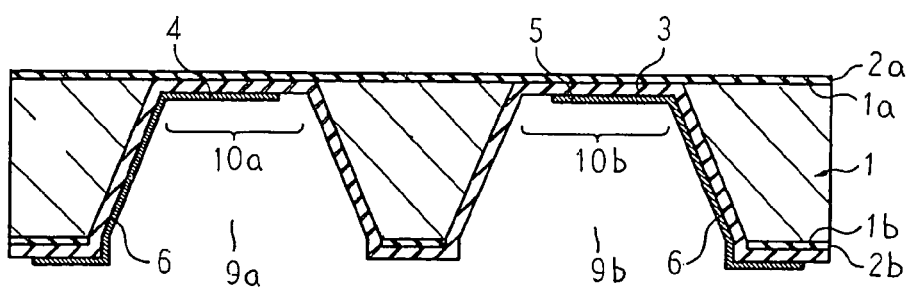
FIG. 5B is another process cross section explaining the method for manufacturing the thermosensitive flow rate detecting element according to Embodiment 1 of the present invention.

Next, a resist is applied by spray coating, etc., to the entire surface of the platinum film on the rear surface of the base material 1, and the platinum film is patterned using a method such as photoengraving, wet etching (or dry etching), etc. Thus, as shown in FIG. 5B, the heating resistor portion 4, the fluid temperature resistance thermometer portion 5, and the first to fourth leader patterns 6a to 6d are formed simultaneously.

Figure 5C:
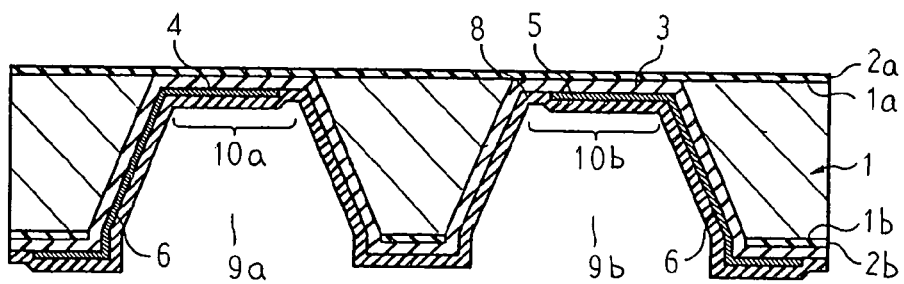
FIG. 5C is yet another process cross section explaining the method for manufacturing the thermosensitive flow rate detecting element according to Embodiment 1 of the present invention.

Then, the resist is removed, and a film of silicon nitride is formed to a thickness of 1.0 $\mu$m, for example, over the entire surface of the base material 1 from the rear surface side using a method such as sputtering or chemical vapor deposition (CVD), etc., to form the rear-surface protective film 8, as shown in FIG. 5C.

Figure 5D:
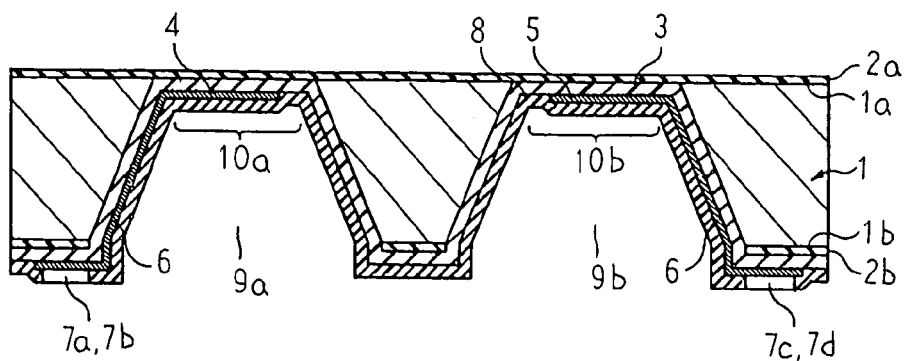
FIG. 5D is yet another process cross section explaining the method for manufacturing the thermosensitive flow rate detecting element according to Embodiment 1 of the present invention.

Next, a resist is applied to the entire surface of the rear-surface protective film 8, and a portion of the rear-surface protective film 8 is removed using a method such as photoengraving, wet etching (or dry etching), etc. Thus, as shown in FIG. 5D, the first to fourth electrodes 7a to 7d are formed by exposing end portions of the first to fourth leader patterns 6a to 6d positioned on the rear surface 1b of the base material 1.

In this manner, the first thin-walled diaphragm 10a formed by laminating the first protective film 2a, the electrically-insulating film 3, the heating resistor portion 4, and the rear-surface protective film 8 is constructed over the first cavity 9a such that a perimeter thereof is supported by the base material 1, and the second thin-walled diaphragm 10b formed by laminating the first protective film 2a, the electrically-insulating film 3, the fluid temperature resistance thermometer portion 5, and the rear-surface protective film 8 is constructed over the second cavity 9b such that a perimeter thereof is supported by the base material 1. The first and second diaphragms 10a and 10b are formed to a size of 1.5 mm×2.0 mm, for example, and the heating resistor portion 4 and the fluid temperature resistance thermometer portion 5 are formed to a size of 0.8 mm×1.0 mm, for example, in central portions of the first and second diaphragms 10a and 10b.

Figure 6:
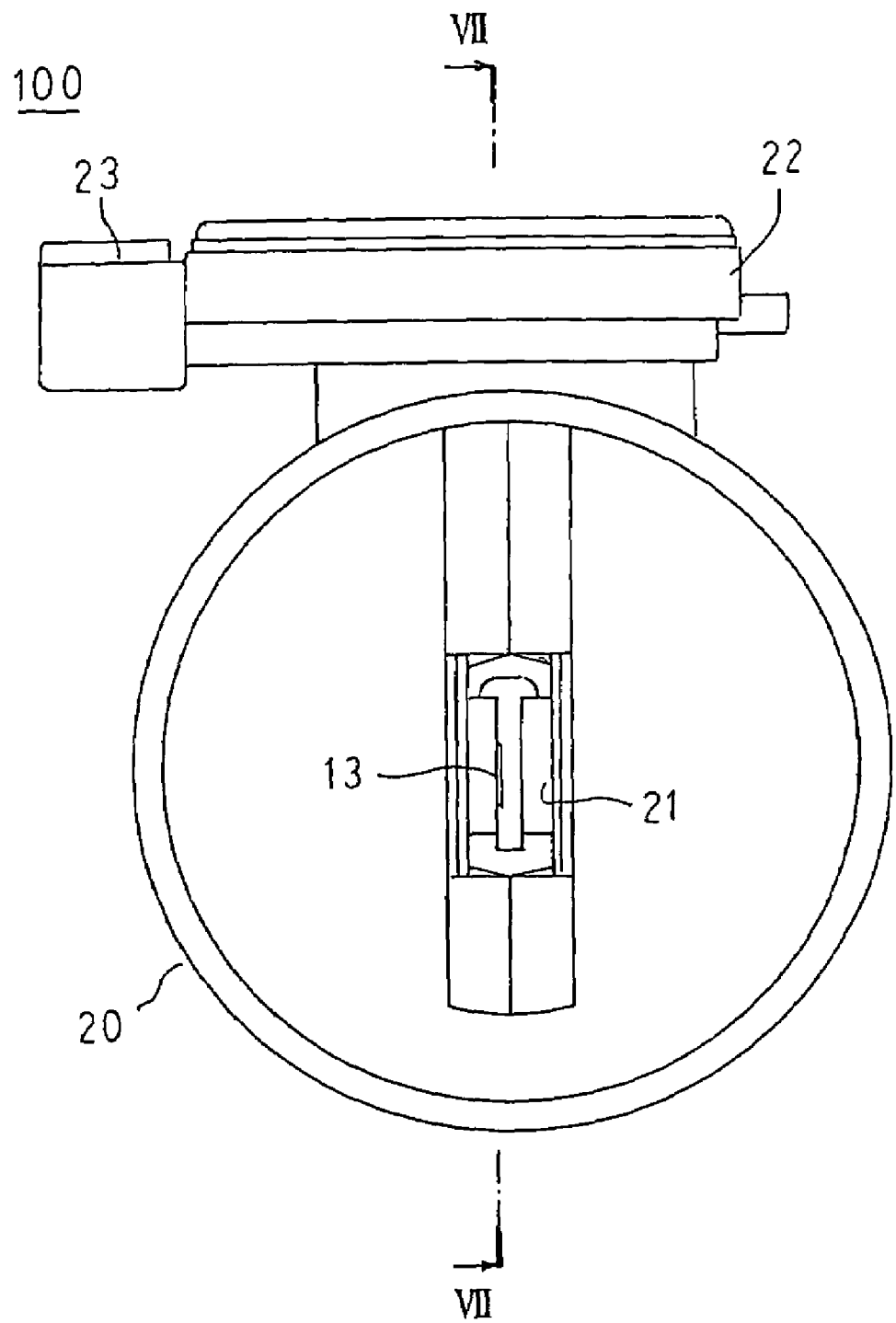
FIG. 6 is a front elevation showing a flow rate sensor using the flow rate detecting element according to Embodiment 1 of the present invention.
Figure 7:
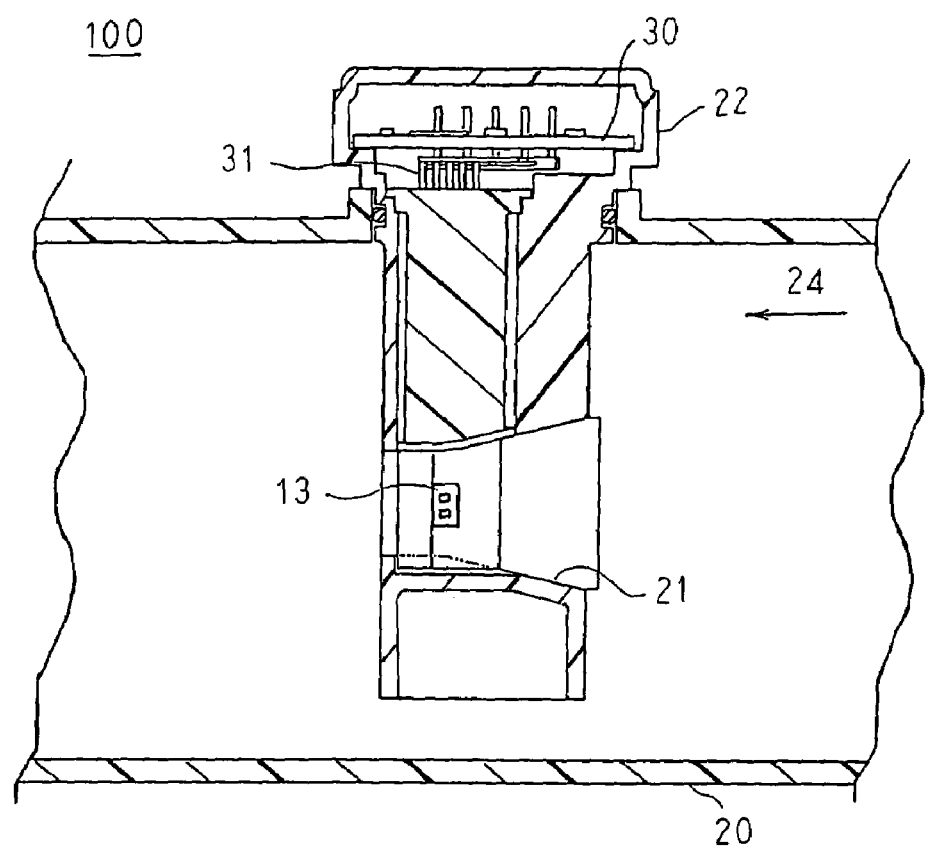
FIG. 7 is a cross section taken along line VII—VII in FIG. 6 viewed from the direction of the arrows.

Next, a construction of a flow rate sensor 100 using a flow rate detecting element 13 prepared in this manner will be explained with reference to FIGS. 6 and 7. FIG. 6 is a front elevation showing a flow rate sensor using the flow rate detecting element according to Embodiment 1 of the present invention, and FIG. 7 is a cross section taken along line VII—VII in FIG. 6 viewed from the direction of the arrows. In FIG. 7, a direction of flow of a fluid being measured relative to the flow rate detecting element is indicated by an arrow 24.

In FIGS. 6 and 7, a flow rate sensor 100 is constituted by: a main passage 20 constituting a passage for a fluid being measured; a detector conduit 21 disposed coaxially with the main passage 20; a case 22 for accommodating a control circuit board 30; a connector 23 for supplying electric power to the flow rate sensor 100 and extracting output; and a flow rate detecting element 13 disposed inside the detector conduit 21. The first to fourth leader patterns 6a to 6d of the flow rate detecting element 13 and the control circuit board 30 are electrically connected by leader wires 31.

The thermosensitive flow rate detecting element 13 is disposed inside the detector conduit 21 such that the front surface of the base material 1 thereof is parallel to the direction of flow 24 of the fluid being measured and the front surface of the base material 1 is exposed to the fluid being measured.

Figure 8:
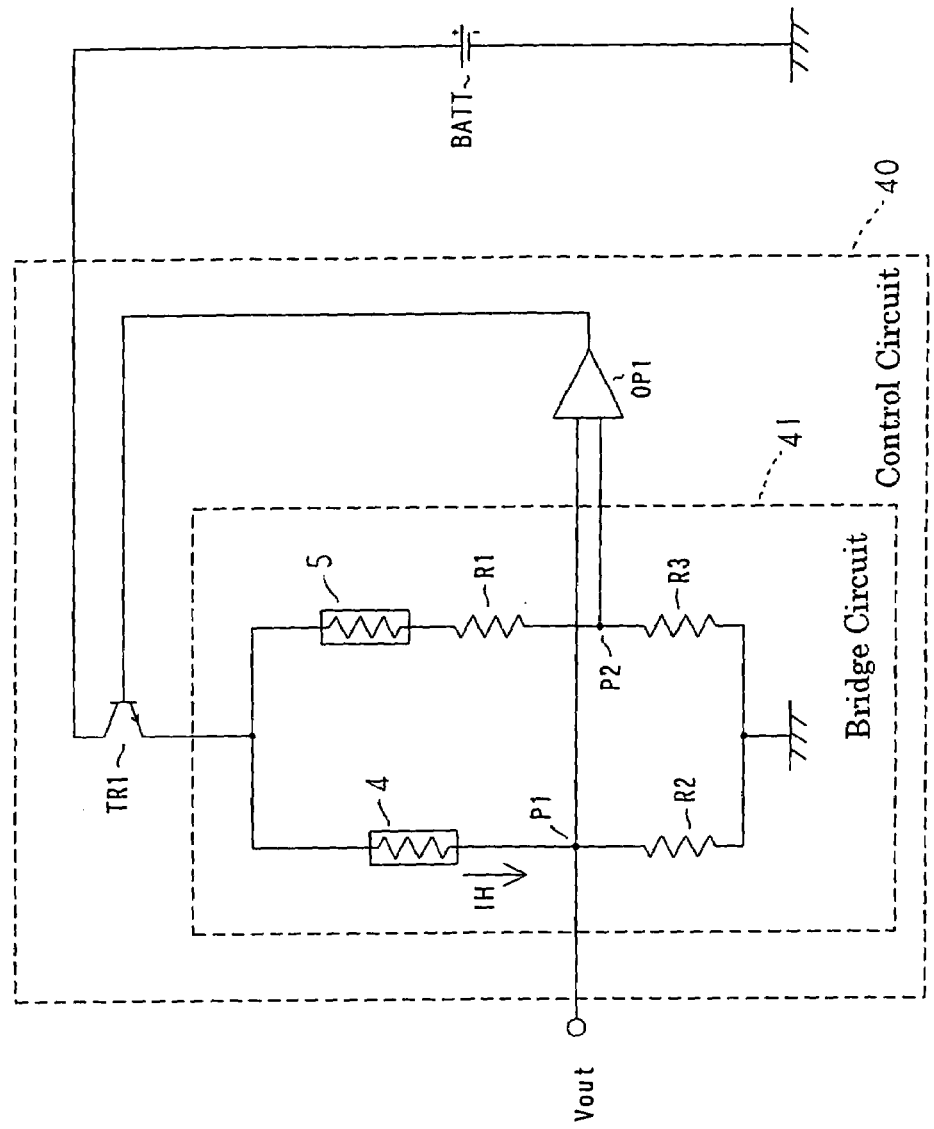
FIG. 8 is a circuit diagram showing a control circuit in the flow rate sensor using the flow rate detecting element according to Embodiment 1 of the present invention.

A control circuit 40 of this flow rate sensor 100, as shown in FIG. 8, is composed of a bridge circuit 41 including the heating resistor portion 4 and the fluid temperature resistance thermometer portion 5. First to third resistors R1, R2, and R3 are fixed resistances, OP1 is an operational amplifier, TR1 is a transistor, and BATT is an electric power supply. Moreover, all portions of the control circuit except for the fluid temperature resistance thermometer portion 5 and the heating resistor portion 4 are mounted to the control circuit board 30.

Because the heating resistor portion 4 and the fluid temperature resistance thermometer portion 5 are constructed into the first and second diaphragms 10a and 10b, respectively, heat generated by the heating resistor portion 4 is not transferred to the fluid temperature resistance thermometer portion 5. Because the fluid temperature resistance thermometer portion 5 is not positioned downstream from the heating resistor portion 4, the fluid temperature resistance thermometer portion 5 is not exposed to fluid being measured that has been warmed by heat transfer from the heating resistor portion 4. Thus, the temperature detected by the fluid temperature resistance thermometer portion 5 is generally equal to the temperature of the fluid being measured.

The control circuit 40 controls a heating current IH in the heating resistor portion 4 by operating so as to generally equalize electric potentials at Points P1 and P2 in FIG. 8. If the flow velocity of the fluid being measured is high, the temperature of the heating resistor portion 4 drops since heat transfer from the heating resistor portion 4 to the fluid being measured increases. Thus, the heating current IH is increased so as to keep the average temperature of the heating resistor portion 4 at a predetermined value, that is, so as to keep the average temperature higher by a predetermined temperature (100 degrees Celsius (° C.), for example) than the temperature of the fluid being measured. By detecting the heating current IH as a voltage Vout at first and second ends of the second resistor R2, a flow velocity or a flow rate through a passage having a predetermined passage cross-sectional area can be detected.

Now, if RH is the resistance value of the heating resistor portion 4, TH is the average temperature of the heating resistor portion 4, TA is the temperature of the fluid being measured, and Q is the flow rate through a passage having a predetermined passage cross-sectional area, then Expression (1) is satisfied.

$$IH^2 \times RH = (a + b \times Q^n) \times (TH - TA) \qquad (1)$$

where a, b, and n are constants determined by the shape of the thermosensitive flow rate detecting element. a is a coefficient corresponding to the amount of heat independent of the flow rate, a large portion thereof being heat transfer loss from heating resistor portion 4 to the base material 1. On the other hand, b is a coefficient corresponding to forced convection heat transfer. n is a value determined by the mode of flow in the vicinity of the heating resistor portion 4, the value thereof being approximately 0.5. As is clear from Expression (1), the amount of heat corresponding to coefficient a does not contribute to flow rate detection.

Thus, by keeping (TH−TA)/RH constant regardless of TA, IH becomes a function of Q. Thus, output corresponding to IH is the detected flow rate output from the flow rate sensor.

According to Embodiment 1, because the first protective film 2a is formed over the entire front surface 1a of the base material 1 and the heating resistor portion 4 and the fluid temperature resistance thermometer portion 5 are formed on portions of the electrically-insulating film 3 coated on the exposed surfaces of the first protective film 2a exposed inside the first and second cavities 9a and 9b, irregularities are eliminated on the front surface of the base material 1 exposed to the flow of the fluid being measured, preventing disturbances to the flow of the fluid being measured and the accumulation of dust on the front surface of the base material 1, thereby enabling flow characteristics to be stabilized.

Because the first to fourth leader patterns 6a to 6d are formed so as to extend outward from the heating resistor portion 4 and the fluid temperature resistance thermometer portion 5 along the wall surfaces of the first and second cavities 9a and 9b and over the rear surface 1b of the base material 1, penetrating apertures for electrode extraction that were disposed in the conventional technique are no longer necessary, enabling reductions in the size of the flow rate detecting element to be achieved. In addition, because reductions in the mechanical strength of the flow rate detecting element resulting from the disposal of the penetrating apertures are eliminated, the occurrence of damage to the base material resulting from stresses during connection processes such as wire bonding, etc., or dropping of the flow rate detecting element can be reduced. Furthermore, because the first to fourth leader patterns 6a to 6d are not exposed on the front surface side of the base material 1, the first to fourth leader patterns 6a to 6d are protected by the base material 1 from the fluid being measured, eliminating defects such as coverage of the first to fourth leader patterns 6a to 6d by foreign matter, thereby enabling reliability to be improved.

Because the heating resistor portion 4 and the first and second leader patterns 6a and 6b are formed integrally in a single thermosensitive resistor film and the fluid temperature resistance thermometer portion 5 and the third and fourth leader patterns 6c and 6d are formed integrally in a single thermosensitive resistor film, problems of bonding strength reductions and changes in resistance in joint portions between conductor portions and conductors that occurred in the conventional technique are eliminated, thereby achieving good reliability.

Because the first and second diaphragm portions 10a and 10b have a first protective film 2a, the mechanical strength of the first and second diaphragm portions 10a and 10b is increased, improving durability.

The heating resistor portion 4 and the fluid temperature resistance thermometer portion 5 are formed on the electrically-insulating film 3 formed on the exposed surfaces of the first protective film 2a inside the first and second cavities 9a and 9b. Because there is no adhesion of foreign matter to the surface of the first protective film 2a exposed by the removal of the base material 1, irregularities are less likely to form on the electrically-insulating film 3 formed on the exposed surface of the first protective film 2a. Thus, the heating resistor portion 4 and the fluid temperature resistance thermometer portion 5 are formed on an electrically-insulating film 3 having no irregularities, reducing inconsistencies in resistance values resulting from irregularities in the heating resistor portion 4 and the fluid temperature resistance thermometer portion 5, thereby raising detection precision. On the other hand, if the heating resistor portion 4 and the fluid temperature resistance thermometer portion 5 were formed on the front surface of the first protective film 2a formed on the front surface 1a of the base material 1, foreign matter would be more likely to adhere to the front surface 1a of the base material 1, whereby irregularities due to the foreign matter would form on the protective film formed on the front surface 1a. As a result, irregularities would be formed in the heating resistor portion 4 and the fluid temperature resistance thermometer portion 5 formed on the front surface of the protective film, giving rise to inconsistencies in resistance values resulting from irregularities in the heating resistor portion 4 and the fluid temperature resistance thermometer portion 5, thereby leading to reductions in detection precision.

Because the first and second cavities 9a and 9b are formed so as to extend from the rear surface side of the base material 1 to the first protective film 2a, and the electrically-insulating film 3 is formed by coating on the exposed surfaces of the rear surface 1b of the base material 1, the wall surfaces of the first and second cavities 9a and 9b, and the first protective film 2a, a thermosensitive resistor film is then formed by coating on the electrically-insulating film 3, and then the heating resistor portion 4, the fluid temperature resistance thermometer portion 5, and the first to fourth leader patterns 6a to 6d are formed by patterning the thermosensitive resistor film, the heating resistor portion 4, the fluid temperature resistance thermometer portion 5, and the first to fourth leader patterns 6a to 6d can be formed simultaneously, eliminating the necessity for a step of forming penetrating apertures and a step of forming conductors inside the penetrating apertures, enabling the flow rate detecting element 13 to be manufactured easily and inexpensively.

Moreover, in Embodiment 1 above, a flow rate detecting element 13 has been explained in which first and second protective films 2a and 2b are formed on first and second surfaces (the front surface 1a and the rear surface 1b) of a base material 1, but the first and second protective films 2a and 2b need only function as masking for formation of the first and second cavities 9a and 9b, and the materials and film formation methods are not limited to those used in the above embodiment. For example, a tape made of a material able to withstand an etchant may also be affixed as the first and second protective films 2a and 2b.

If the first and second protective films 2a and 2b are materials whose physical properties degrade flow rate detection performance, materials in which stresses are high and dust resistance is reduced, the first and second protective films 2a and 2b may also be removed. For example, if the first and second protective films 2a and 2b are thermal oxidation films, the second protective film 2b can be removed by etching using a buffered hydrofluoric acid after the step in FIG. 4C, and the first protective film 2a after the step in FIG. 4D. Here, even if the first protective film 2a is removed, because the electrically-insulating film 3 is positioned in a common plane with the front surface 1a of the base material 1 and covers the aperture on the front surface side of the first and second cavities 9a and 9b, irregularities are eliminated on the front surface of the base material 1 exposed to the flow of the fluid being measured, thereby enabling flow characteristics to be stabilized.

In Embodiment 1 above, a silicon substrate is explained as being used for the base material 1, but the material of the base material 1 is not particularly limited thereto and for example, an alumina substrate or a glass substrate may also be used.

Embodiment 2

FIG. 9 is a cross section showing a thermosensitive flow rate detecting element according to Embodiment 2 of the present invention.

In FIG. 9, a base material 1A is an alumina substrate formed into a flat, rectangular shape, for example. An electrically-insulating film 3a composed of a silicon nitride film, etc., is formed over an entire surface of a front surface 1a of the base material 1A. A protective film 3b composed of a silicon nitride film, etc., is formed over an entire surface of a rear surface 1b of the base material 1A so as to have two rectangular aperture portions. First and second cavities 9a and 9b are formed by removing portions of the base material 1A so as to extend to the electrically-insulating film 3a from each of the aperture portions of the protective film 3b.

A heating resistor portion 4 composed of a thermosensitive resistor film of platinum, etc., is formed on an exposed surface of the electrically-insulating film 3a inside the first cavity 9a, and a fluid temperature resistance thermometer portion 5 composed of a thermosensitive resistor film of platinum, etc., is formed on an exposed surface of the electrically-insulating film 3a inside the second cavity 9b. First to fourth leader patterns 6a to 6d are formed so as to extend from end portions of the heating resistor portion 4 and the fluid temperature resistance thermometer portion 5 along the wall surfaces of the first and second cavities 9a and 9b to the rear surface 1b of the base material 1A. In addition, an electrically-insulating rear-surface protective film 8 made of silicon nitride, etc., is formed so as to cover the heating resistor portion 4, the fluid temperature resistance thermometer portion 5, and the first to fourth leader patterns 6a to 6d.

Finally, first to fourth electrodes 7a to 7d are formed by removing portions of the rear-surface protective film 8 so as to expose end portions of the first to fourth leader patterns 6a to 6d.

Here, a first thin-walled diaphragm 10a formed by laminating the electrically-insulating film 3a, the heating resistor portion 4, and the rear-surface protective film 8 is constructed over the first cavity 9a such that a perimeter thereof is supported by the base material 1A. Similarly, a second thin-walled diaphragm 10b formed by laminating electrically-insulating film 3a, the fluid temperature resistance thermometer portion 5, and the rear-surface protective film 8 is constructed over the second cavity 9b such that a perimeter thereof is supported by the base material 1A.

Next, a method for manufacturing a flow rate detecting element 13A constructed in this manner will be explained.

First, a base material 1A composed of a flat, rectangular alumina substrate is prepared, and films of silicon nitride are formed to a thickness of 1.0 μm, for example, over the entire surfaces of the front surface 1a and the rear surface 1b of the base material 1A using a method such as sputtering or chemical vapor deposition (CVD), etc. The silicon nitride film formed on the front surface 1a of the base material 1 constitutes the electrically-insulating film 3a, and the silicon nitride film formed on the rear surface 1b constitutes the protective film 3b.

Next, a resist is applied to the entire surface of the protective film 3b formed on the rear surface 1b of the base material 1A, and the resist is patterned using a photoengraving technique to form rectangular apertures in the resist. Portions of the protective film 3b exposed through the aperture portions are removed by etching to form rectangular etching apertures.

Next, the base material 1A is removed by etching from the etching apertures through to the protective film 3b to form the first and second cavities 9a and 9b.

Next, the resist is removed, and a film of platinum is formed to a thickness of 0.2 μm, for example, over the rear surface 1b of the base material 1A, the first and second cavities 9a and 9b, and exposed surfaces of the electrically-insulating film 3a from the rear surface side of the base material 1A using a method such as vapor deposition or sputtering, etc.

Next, a resist is applied by spray coating, etc., to the entire surface of the platinum film on the rear surface of the base material 1A, and the platinum film is patterned using a method such as photoengraving, wet etching (or dry etching), etc. Thus, the heating resistor portion 4, the fluid temperature resistance thermometer portion 5, and the first to fourth leader patterns 6a to 6d are formed simultaneously.

Then, the resist is removed, and a film of silicon nitride is formed to a thickness of 1.0 μm, for example, over the entire surface of the base material 1A from the rear surface side using a method such as sputtering or chemical vapor deposition (CVD), etc., to form the rear-surface protective film 8.

Finally, a resist is applied to the entire surface of the rear-surface protective film 8, and a portion of the rear-surface protective film 8 is removed using a method such as photoengraving, wet etching (or dry etching), etc. Thus, the first to fourth electrodes 7a to 7d are formed by exposing end portions of the first to fourth leader patterns 6a to 6d positioned on the rear surface 1b of the base material 1A.

Thus, in Embodiment 2, because the electrically-insulating film 3a is formed over the entire surface of the front surface 1a of the base material 1A, eliminating irregularities on the front surface of the base material 1A exposed to the fluid being measured, and the first to fourth leader patterns 6a to 6d are formed so as to extend outward from the heating resistor portion 4 and the fluid temperature resistance thermometer portion 5 along the wall surfaces of the first and second cavities 9a and 9b and over the rear surface 1b of the base material 1A, similar effects to those in Embodiment 1 above can also be achieved.

According to Embodiment 2, because the heating resistor portion 4 and the fluid temperature resistance thermometer portion 5 are formed directly on exposed surfaces of the electrically-insulating film 3a formed on the front surface 1a of the base material 1A exposed inside the first and second cavities 9a and 9b, the manufacturing process can be simplified compared to Embodiment 1 above.

Moreover, in each of the above embodiments, a direct heating control method has been explained, but although not shown here, the same also applies to any thermosensitive flow rate detecting element having a diaphragm construction, for example, temperature difference detection methods in which resistance thermometer portions are disposed upstream and downstream from a heating resistor portion, or double heater methods having two heating resistor portions.

In each of the above embodiments, a rear-face protective film 8 is formed so as to cover the thermosensitive resistor films constituting the heating resistor portion 4, the fluid temperature resistance thermometer portion 5, and the first to fourth leader patterns 6a to 6d to prevent the occurrence of electrolysis on the thermosensitive resistor film if water enters on the rear surface 1b side of the base material 1. However, if the thermosensitive flow rate detecting element is used in a flow rate sensor having a waterproof construction in which the rear surface 1b side of the base material 1 is not exposed to the fluid being measured, it is not absolutely necessary to provide the rear-surface protective film 8.

In each of the above embodiments, silicon nitride films are explained as being used for the electrically-insulating films 3 and 3a, but the electrically-insulating films 3 and 3a are not limited to silicon nitride films, and for example, silicon oxide films such as phosphosilicate glass (PSG) films, etc., or alumina films can also be used.

In each of the above embodiments, platinum is used for the thermosensitive resistor film, but the thermosensitive resistor film is not limited to platinum and, for example, nickel or a nickel-iron alloy (such as permalloy, trademark of the Western Electric Company) can be used.

What is claimed is:

1. A thermosensitive flow rate detecting element comprising:
   a flat base material;
   a cavity formed so as to pass through said base material from a rear surface to a front surface;
   an electrically-insulating film formed so as to be positioned in a common plane with said front surface of said base material and to cover an aperture of said cavity on said front surface side of said base material; and
   a heating resistor portion composed of a thermosensitive resistor film formed from a rear surface side of said base material and extending to cover a portion of said electrically-insulating film formed at a position of said aperture of said cavity.

2. The thermosensitive flow rate detecting element according to claim 1, further comprising a protective film formed so as to cover said front surface of said base material and an exposed surface of said electrically-insulating film exposed through said aperture of said cavity on said front surface side of said base material.

3. The thermosensitive flow rate detecting element according to claim 1, further comprising a leader pattern constituted by a portion of said thermosensitive resistor film constituting said heating resistor portion extending outward from said heating resistor portion along a wall surface of said cavity onto said rear surface of said base material.

4. The thermosensitive flow rate detecting element according to claim 1, wherein an uppermost portion of a front surface of said electrically-insulating film is coplanar with said front surface of said base material.

5. The thermosensitive flow rate detecting element according to claim 1, further comprising a protective film formed so as to cover and contact with said front surface of said base material and an exposed surface of said electrically-insulating film exposed through said aperture of said cavity on said front surface side of said base material.

6. A thermosensitive flow rate detecting element comprising:
   a flat base material having an electrically-insulating film formed over an entire surface of a front surface;
   a cavity formed by removing a portion of said base material from a rear surface side of said base material so as to extend to said electrically-insulating film; and
   a heating resistor portion composed of a thermosensitive resistor film formed on an exposed surface of said electrically-insulating film exposed inside said cavity.

7. The thermosensitive flow rate detecting element according to claim 6, further comprising a leader pattern constituted by a portion of said thermosensitive resistor film constituting said heating resistor portion extending outward from said heating resistor portion along a wall surface of said cavity onto said rear surface of said base material.

* * * * *